Patented Mar. 13, 1934

1,950,954

UNITED STATES PATENT OFFICE 1,950,954

CEMENTING AGENT FOR CELLULOSIC PLASTICS

James F. Walsh, South Orange, and Amerigo F. Caprio, Newark, N. J., assignors to Celluloid Corporation, a corporation of New Jersey No Drawing. Application January 11, 1930, Serial No. 420,151

16 Claims. (Cl. 154—49)

This invention pertains to the general class of cementing agents for cellulosic plastics, and particularly to the class of cementing agents for cellulose acetate plastics.

In the cementation of cellulosic plastics, and more particularly cellulose acetate plastics, many difficulties are encountered in obtaining a firm, permanent bond between the cemented surfaces that is free from bubbles or air pockets, and that exhibits no tendency to loosen or separate under various conditions of use. These difficulties are unusually marked in cementing highly polished cellulosic plastic parts together, especially when the plastic is made with cellulose acetate.

The use of a highly volatile solvent, although very active in penetrating the surfaces to be joined, generally leaves the product with bubbles or pockets between the surfaces to be joined, because of its highly volatile character. Solvents of low volatility do not leave bubbles or pockets between the surfaces to be joined, but are so inactive, and the penetration of the surfaces of the cellulosic plastic is at so low a rate, that their use is highly impracticable.

An object of our invention, therefore, is to provide a novel cementing agent for cellulosic plastics, and particularly cellulose acetate plastics.

A further object of our invention is to provide novel means for cementing cellulosic plastics, and particularly cellulose acetate plastics.

A further object of our invention is to provide a cementing agent for cellulosic plastics, and particularly cellulose acetate plastics, that will not result in bubbles or pockets; that will firmly and permanently join the parts; that is active in character; that permits a practical rate of production; that is simple in use, and that is otherwise highly satisfactory for its intended purpose.

Many other objects and advantages will become apparent to persons skilled in the art as the specification proceeds.

In our novel cementing agent, we employ, first, a high boiling liquid solvent having a boiling point preferably above 200° C. This class of solvents we prefer to term "Class A". Examples of Class A solvents are benzyl alcohol, triacetin, dimethyl phthalate, diethyl phthalate, dibutyl phthalate, dibutyl tartrate, monomethyl xylene sulphonamid, paraethyl toluene sulphonamid, triphenyl phosphate, tricresyl phosphate, etc. or combinations of such solvents.

To the Class A solvent we add a medium boiling solvent having a boiling point preferably between 100° C. and 200° C. This class of solvents, we prefer to term "Class B". Examples of Class B solvents are ethyl lactate, butyl acetate, methyl and ethyl oxybutyrate, "dioxan", monomethyl ether of ethylene glycol, monoethyl ether of ethylene glycol, glycol diacetate, cyclohexanone and methyl cyclohexanone, acetic acid, dichlorhydrin, diacetone alcohol, etc., or combinations of such solvents.

To the Class A and Class B solvents, we add a low boiling solvent having a boiling point preferably below 100° C. This class of solvents we prefer to term "Class C". Examples of Class C solvents are acetone, methyl acetate, chloroform, ethylene dichloride, etc., or combinations of same, or combinations of any of the foregoing with methyl alcohol and/or ethyl alcohol.

The function of the Class C solvents is to dissolve and rapidly penetrate into the cellulosic plastic and thus render the surface active for cementation purposes. The Class C solvents, however, are highly volatile and generally produce a plurality of bubbles and blushing on the surfaces to be joined. A function of the Class B solvents, therefore, is to reduce the volatility of the Class C solvents, to remove the formation of bubbles, to prevent blushing and to blend or merge the effect of the very active low boiling solvents with the high boiling solvents.

A function of the Class A solvents is to maintain and preserve tackiness of the surfaces prior to cementation, and to prevent the surfaces from becoming dry and hard before the operation is completed. The Class A solvents, however, are slowly active in solvent character, and do not rapidly penetrate into the surfaces of the cellulosic plastic. A further function of the Class B solvents, therefore, is to hasten or speed up the action of Class A solvents, and to blend or merge the effect of same with the very active Class C solvents.

Our novel cement may be used with any of the processes or apparatus known in the art. One means of cementing surfaces together is by brushing the surfaces with the cement and applying heat and pressure to the parts by means of a steam heated hydraulic press. Any desired pressure may be employed with or without heat, as desired. We have satisfactorily cemented highly polished sheets of cellulose acetate plastics, after having applied a pressure of ten pounds per square inch at 100° C. for one minute, and then cooling the parts while still under pressure. The pressures, temperatures and periods of time, however, may be varied without apparent limit.

While we do not limit ourselves to any particular formula, we find the following produce very satisfactory results:

Formula 1

| | Parts |
|---|---|
| Class A solvents | 5 to 100 |
| Class B solvents | 25 to 100 |
| Class C solvents | 5 to 50 |

Formula 2

| | Parts |
|---|---|
| Dibutyl phthalate | 100 |
| Butyl acetate | 50 |
| Ethyl acetate | 50 |

Formula 3

| | Parts |
|---|---|
| Tricresyl phosphate | 5 |
| Mono ethyl ether of ethylene glycol | 100 |
| Acetone | 5 |

Formula 4

| | Parts |
|---|---|
| Tricresyl phosphate | 25 |
| Ethyl oxy butyrate | 100 |
| Ethyl alcohol | 25 |

Formula 5

| | Parts |
|---|---|
| Diethyl phthalate | 50 |
| Dioxan | 100 |
| Ethyl alcohol | 50 |

Formula 6

| | Parts |
|---|---|
| Triacetin | 100 |
| Methyl oxy butyrate | 25 |
| Methyl acetate | 25 |

Formula 7

| | | Parts |
|---|---|---|
| Dibutyl tartrate | | 100 |
| Ethyl lactate | Class B | 20 |
| Diacetone alcohol | Class B | 20 |
| Ethylene dichloride | | 15 |

Formula 8

| | Parts |
|---|---|
| Dimethyl phthalate | 5 |
| Mono methyl ether of ethylene glycol | 90 |
| Methyl acetate | 5 |

Formula 9

| | Parts |
|---|---|
| Mono methyl xylene sulphonamid | 100 |
| Ethyl lactate | 50 |
| Ethyl alcohol | 50 |

Formula 10

| | Parts |
|---|---|
| Paraethyltoluol sulphonamid | 25 |
| Dioxan | 100 |
| Acetone | 10 |

While these formulæ are applicable to cellulosic plastics in general, Formulæ 2, 3, 4, and 5 are especially suited for cellulose nitrate plastics, whereas Formulæ 6, 7, 8, 9, and 10, are especially suitable for cellulose acetate plastics.

It is, of course, understood that each of the chemical compounds used in making up the compound solvent, whether in Class A, Class B, or Class C, should exhibit the solvent action characteristic of its class for the particular material to be cemented.

The classes of solvents may be mixed in any order, and one or more solvents in any particular class may be employed to make up the total solvent for that class.

Should a cement with body or a higher viscosity be desired, various amounts of cellulose derivatives may be dissolved therein but preferably not over 5% of the derivative.

While the invention has been described in connection with cellulosic plastics, which term includes cellulose nitrate, cellulose acetate, cellulose propionate, cellulose formate, cellulose butyrate, methyl cellulose, ethyl cellulose, benzyl cellulose, cellulose phthalate, etc., our cement is very useful in cementing many other materials, such as vinyl compounds, casein products, viscose, etc.

Having described our invention, it is obvious that many modifications may be made in the same within the scope of the claims without departing from the spirit of the invention.

We claim:

1. A cementing agent for cellulosic plastics comprising a mixture of solvents for said plastics, said mixture consisting of a high boiling solvent, a medium boiling solvent, and a low boiling solvent.

2. A cementing agent for cellulose acetate plastics comprising a mixture of solvents for said plastics, said mixture consisting of a high boiling solvent, a medium boiling solvent, and a low boiling solvent.

3. A cementing agent for cellulosic plastics comprising a mixture of solvents for said plastics, said mixture consisting of a solvent having a boiling point above approximately 200° C., a solvent having a boiling point between approximately 100° C. and approximately 200° C., and a solvent having a boiling point below approximately 100° C.

4. A cementing agent for cellulose acetate plastics comprising a mixture of solvents for said plastics, said mixture consisting of a solvent having a boiling point above approximately 200° C., a solvent having a boiling point between approximately 100° C. and approximately 200° C., and a solvent having a boiling point below approximately 100° C.

5. A cementing agent for cellulosic plastics comprising a mixture of solvents for said plastics, said mixture consisting of substantially 5 to 100 parts of a high boiling solvent, 25 to 100 parts of a medium boiling solvent, and 5 to 50 parts of a low boiling solvent.

6. A cementing agent for cellulose acetate plastics comprising a mixture of solvents for said plastics, said mixture consisting of substantially 5 to 100 parts of a high boiling solvent, 25 to 100 parts of a medium boiling solvent, and 5 to 50 parts of a low boiling solvent.

7. A cementing agent for cellulosic plastics comprising a mixture of solvents for said plastics, said mixture consisting of substantially 5 to 100 parts of a solvent having a boiling point above approximately 200° C., 25 to 100 parts of a solvent having a boiling point between approximately 100° C. and 200° C., and 5 to 50 parts of a solvent having a boiling point below approximately 100° C.

8. A cementing agent for cellulose acetate plastics comprising a mixture of solvents for said plastics, said mixture consisting of substantially 5 to 100 parts of a solvent having a boiling point above approximately 200° C., 25 to 100 parts of a solvent having a boiling point between approximately 100° C. and 200° C., and 5 to 50 parts of a solvent having a boiling point below approximately 100° C.

9. The process of cementing cellulosic plastics comprising applying a cement to the surfaces to be joined, said cement comprising a mixture of solvents for said plastics, said mixture consisting of a high boiling solvent, a medium boiling solvent, and a low boiling solvent, bringing the surfaces into contact, and applying pressure.

10. The process of cementing cellulosic plastics comprising applying a cement to the surfaces to be joined, said cement comprising a mixture of solvents for said plastics, said mixture consisting of a high boiling solvent, a medium boiling solvent, and a low boiling solvent, bringing the surfaces into contact, and applying pressure with heat.

11. The process of cementing cellulose acetate plastics comprising applying a cement to the surfaces to be joined, said cement comprising a mixture of solvents for said plastics, said mixture consisting of a high boiling solvent, a medium boiling solvent and a low boiling solvent, bringing the surfaces into contact, and applying pressure.

12. The process of cementing cellulose acetate plastics comprising applying a cement to the surfaces to be joined, said cement comprising a mixture of solvents for said plastics, said mixture consisting of a high boiling solvent, a medium boiling solvent and a low boiling solvent, bringing the surfaces into contact, and applying pressure with heat.

13. The process of cementing cellulosic plastics comprising applying a cement to the surfaces to be joined, said cement comprising a mixture of solvents for said plastics, said mixture consisting of substantially 5 to 100 parts of a high boiling solvent, 25 to 100 parts of a medium boiling solvent, and 5 to 50 parts of a low boiling solvent, bringing the surfaces into contact, and applying pressure.

14. The process of cementing cellulosic plastics comprising applying a cement to the surfaces to be joined, said cement comprising a mixture of solvents for said plastics, said mixture consisting of substantially 5 to 100 parts of a high boiling solvent, 25 to 100 parts of a medium boiling solvent, and 5 to 50 parts of a low boiling solvent, bringing the surfaces into contact, and applying pressure with heat.

15. The process of cementing cellulose acetate plastics comprising applying a cement to the surfaces to be joined, said cement comprising a mixture of solvents for said plastics, said mixture consisting of substantially 5 to 100 parts of a high boiling solvent, 25 to 100 parts of a medium boiling solvent, and 5 to 50 parts of a low boiling solvent, bringing the surfaces into contact and applying pressure.

16. The process of cementing cellulose acetate plastics comprising applying a cement to the surfaces to be joined, said cement comprising a mixture of solvents for said plastics, said mixture consisting of substantially 5 to 100 parts of a high boiling solvent, 25 to 100 parts of a medium boiling solvent, and 5 to 50 parts of a low boiling solvent, bringing the surfaces into contact and applying pressure with heat.

JAMES F. WALSH.
AMERIGO F. CAPRIO.